Nov. 25, 1952  D. F. ILLIAN  2,619,557
PROGRAM SELECTOR SWITCH
Filed Oct. 1, 1951
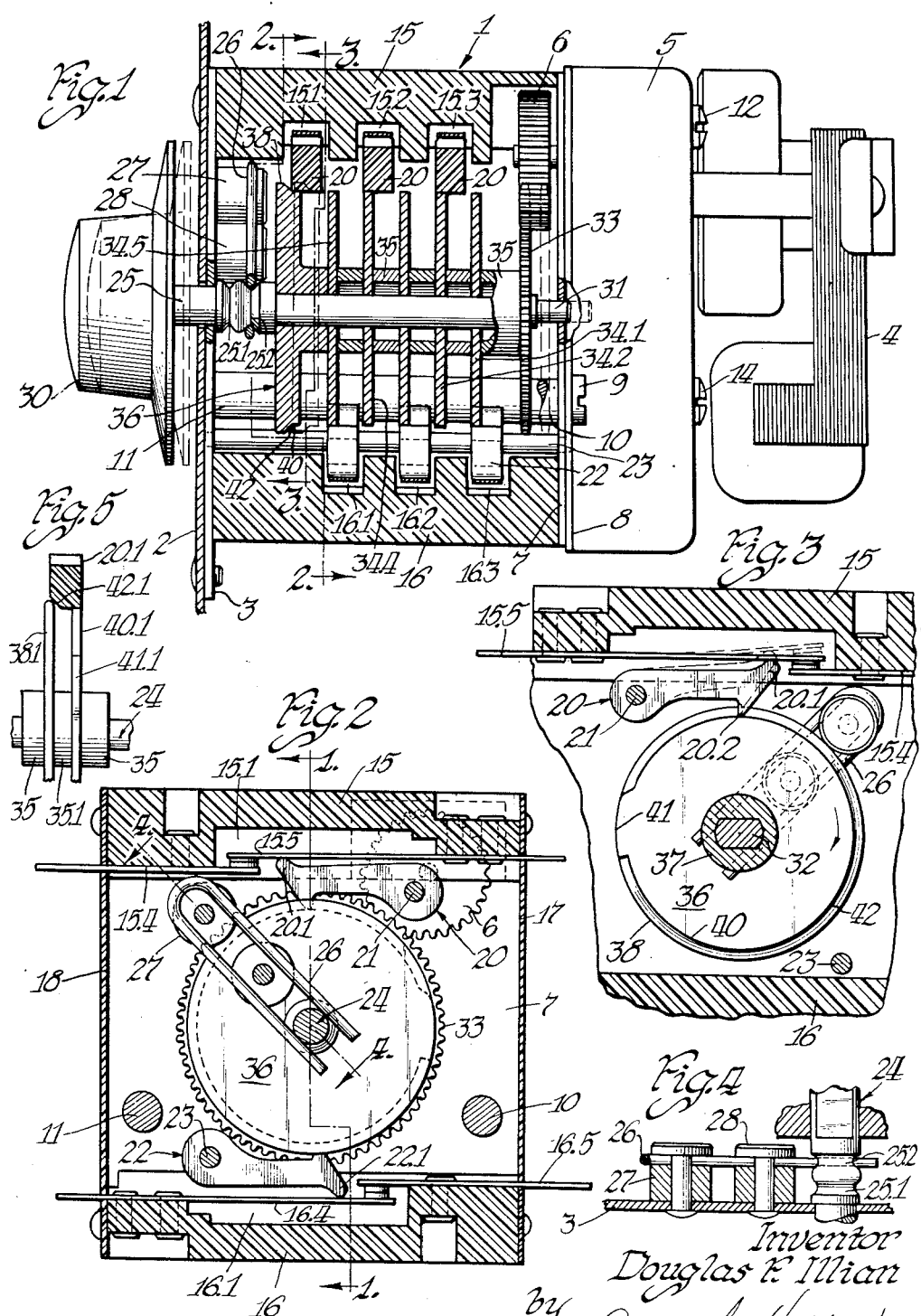
Inventor
Douglas F. Illian Patented Nov. 25, 1952

2,619,557

UNITED STATES PATENT OFFICE 2,619,557

PROGRAM SELECTOR SWITCH

Douglas F. Illian, Oak Park, Ill., assignor to Hotpoint Inc., a corporation of New York Application October 1, 1951, Serial No. 249,122

7 Claims. (Cl. 200—33)

This invention relates to program selector switches, and although not limited thereto, is particularly well adapted to program switches used in controlling dishwashing and clothes washing machines in which varously timed operations are carried out in a pre-established sequence.

Such switches usually include a plurality of cams collectively rotated at a timed rate by a conventional timer motor; each cam controls one or more switches in the electrical circuits of components of the apparatus such as the main driving devices, water and drain valves, and the timer motor itself. A main line switch cam opens the circuit at the completion of the sequence of operations, and to restart the apparatus the operator manually turns a control knob to rotate the cam shaft to bring the main control switch cam again to circuit closing position. In brief, the program switch also functions as an on-off switch for the apparatus. It frequently happens that the operator wishes to stop the apparatus when it is only partially through the program and to restart it at that same point, or wishes manually to advance the program to skip some intermediate operation.

In conventional program selector switches with which I am familiar, it is usual to provide a second main line switch for these temporary or optional interruptions. The second switch is arranged in series with the cam-actuated switch, for the cam-actuated switch should and will remain closed until the timer motor has rotated the switch cam to its final "off" position. Means have been provided on certain of these presently-known switches to operate the auxiliary switch by a push-pull movement of the cam shaft, thus eliminating a separate operating element.

It is a principal object of the present invention to provide an improved program selector switch having but a single line swtch and yet providing complete manual control permitting the operator to stop the apparatus and restart it at the same point, or to stop the apparatus, advance the switch to some operation later in the sequence, and restart it at such advance point. In a preferred form of the invention, I utilize the main switch cam for this manual control of the switch; that is to say, I provide means on said cam which regardless of the angular relation of the normal switch-operating portion of the cam to the switch-actuating follower, will upon axial displacement of the cam actuate the follower to open the line switch. For example, I use cam means having one portion adapted about its full periphery to operate the cam follower to open the line switch, and another portion in which the greater length of the circumference has a uniform radius effective to operate the follower to closed circuit position and a small portion of other radius sufficient to move the follower to open circuit position. The manual control over the switch is effected by the first-named portion, and normal automatic operation by the second cam portion. Although I may employ two structurally independent cams common to the same switch follower, manufacturing advantages accrue from the use of a plate cam of sufficient thickness to have the respective cam follower actuating portions constitute axially displaced peripheries separated by a sloping ramp traversed by the cam follower as the cam is axially shifted relative to the follower. In any event, the cam shaft is arranged for axial displacement between established limits; and when the operator wishes to stop the machine it is necessary only to shift the cam shaft so as to make the follower cooperate with the cam effective to move it to switch opening position. If the cycle is to be advanced, the operator rotates the cam shaft as desired and then axially displaces the shaft to its normal operating position.

Other features and advantages of the invention will be apparent from the following description of presently preferred embodiments thereof, read with the accompanying drawing, in which:

Fig. 1 is a side elevaton of a program switch embodying the invention, the switch per se being in section; Fig. 2 is an end sectional elevation looking in the direction of the arrows 2—2 of Fig. 1; Fig. 3 is an end sectional elevation looking in the direction of the arrows 3—3 of Fig. 1; Fig. 4 is a fragmentary sectional view of a suitable shaft detent, taken along lines 4—4 of Fig. 2; and Fig. 5 is a fragmentary sectional elevation of a second form of cam expressing the principles of the invention.

In Fig. 1, the program switch 1 is arranged to be mounted on a frame panel 2 of a washing or other machine which it controls, as by bolting or otherwise securing a switch body plate 3 to said panel. The switch mechanism is driven by the usual combination of a synchronous timer motor 4 and transmission unit 6 terminating in the slow-speed driving pinion 5. If desired, the transmission unit may be of the well known escapement type which would rotate the pinion in pulses of uniform angular extent. The transmission unit may be mounted on a switch body plate 7; for example, the casing of the unit may have a flange 8 through which extend screws 9 entering the ends of switch body frame studs 10, 11. Other screws 12, 14, may secure the casing to plate 7, as may be expedient. For purposes of illustration, plates 3 and 7 have been shown in elevation, rather than section.

The program switch may embody any conventional arrangement of cam operated switches. For example, upper and lower body plates 15, 16—to which the side plates 17 and 18 are secured after the assembly is completed—may be molded from phenolic condensate or other suitable electrical insulation, to have the respective pluralities of pockets 15.1, 15.2, 15.3 and 16.1, 16.2, 16.3. Within these pockets are confined the switches and the cam followers which operate them. Assuming that the various switches and followers are identical in construction and arrangement, an upper switch may include a heavy fixed contact member 15.4 and a light springable contact member 15.5, each riveted or otherwise secured to plate 15 and having terminal projections for connection to the conductors (not shown) of the circuit. Similarly, the several lower tier switches may include a light springable contact member 16.4 and a heavy fixed contact member 16.5, each secured to the plate 16 and having the terminal extensions as shown. An upper tier cam follower 20 is freely pivoted on a shaft 21 and has a head 20.1 engaging with the flexible contact member 15.5 being biased thereby into counterclockwise rotation about shaft 21, as viewed in Fig. 2. A typical lower tier cam follower 22 is freely pivotally mounted on a shaft 23 and has a head 22.1 engaging with the flexible switch contact member 16.4, being biased thereby for counterclockwise rotation about said shaft. Each follower has a cam-engaging toe portion—see 20.2, Fig. 3. The follower shafts 21, 23, are suitably mounted in the end plates 3 and 7 and are accurately parallel to a cam shaft 24 also journaled in said plates. One end 25 of said cam shaft is formed with two axially spaced circular detent grooves 25.1 and 25.2 with which cooperates a "hairpin" spring detend 26 carried by the studs 27 and 28, fixed to plate 3. To the end of said shaft is fixed a knob 30 by which the shaft may manually be rotated (usually in only one direction by reason of detent means not shown), or axially shifted between the two detent positions. The opposite end of shaft 24 has a reduced diameter portion 31 by which the shaft is supported for rotation and axial movement in end plate 7. Intermediate said end portions 25 and 31 the shaft has a non-circular portion 32 to the end of which is secured a gear 33 in continuous mesh with drive pinion 5. Along the remainder of the non-circular portion are the series of plate cams 34.1 to 34.5 inclusive for cooperation with the cam followers of the upper and lower tiers to operate switches in the various circuits of the apparatus. The cams are maintained in spaced relationship by spacers 35, which are of such length as to insure that there will be no conflict between the cams and adjacent cam followers as the shaft 24 is shifted from one to the other of its detent positions.

So far, it may be assumed that the program switch has been of conventional construction. The cams have the usual small radius and large radius peripheral portions, now shown, along which the toes of the followers ride as the cam shaft is rotated by the timer mechanism, and the switches served by the followers are opened or closed for the duration established by the configuration of the cams. Such cam and control switch circuits are well known in the art.

Cam 36, embodying the present invention, controls the switch contact element 15.5, and it may be assumed that this and fixed contact 15.4 comprise the switch in the circuit which exercises master control over the apparatus. Cam 36 has a relatively wide hub 37 spacing cams 36 and 34.5. The operating portion of cam 36 is made thick enough to provide one periphery 38 having a uniform radius to lift follower 20 to separate the contacts 15.4 and 15.5 as indicated in dotted line in Fig. 3; a second periphery 40 which has one or more portions 41 of limited angular extent having the necessary circuit-opening radius, the remainder being as required to drop the cam follower to circuit-closing position; and a sloping ramp 42 which when the cam is shifted axially between the respective detent positions 25.1 and 25.2 is traversed by the toe of the follower.

The operation of the program selector switch is simple. It will be assumed that the switch is in normal "off" position, in which the cam shaft is in its leftwardly drawn position of Fig. 1 and the cam system has been driven by the timer motor through a full previous cycle of operations, the end of which is determined by cam 36 having rotated to the position in which portion 41 raises follower 20 to switch opening position. To start another cycle of operations, the operator manually rotates the knob 30 until the follower 20 drops off cam portion 41 to the small radius portion 40, thereby permitting contact 15.4 to close with 15.5. It is understood that this closes a main circuit which among other things energizes timer motor 4. The program switch proceeds in normal manner, with the several cams being rotated in unison by shaft 24 and operating their associated switches between open or closed positions according to the cam contour.

If however the operator wishes to halt the machine, it is only necessary to push in on knob 30, thus shifting the cam shaft to the other of its detent positions. During this axial movement, the ramp 42 urges the follower 20 upwardly until it rides on the large radius periphery 38, opening the contacts 15.4 and 15.5 and interrupting the main circuit. To restart the operation at the same point in the cycle, the operator draws outwardly on the knob, moving the cam shaft and associated cams leftwardly of Fig. 1 and the follower returns to the low periphery 40, reclosing the circuit. If the operator wishes to advance the operation to a subsequent cycle, he will rotate knob 30 to the desired position while the follower is still on the periphery 38, and then reclose the circuit by drawing outwardly on the knob 30.

It will be noted that the various cam followers are at least as wide as the maximum axial movement of the cams with respect thereto so that they never disengage during such movement. Pinion 5 is of similar width, to maintain engagement with gear 33. Of course more than one cam such as 36 may be used in the cam bank. For example, a water valve operating solenoid may open the valve when the solenoid is energized, and it may be advantageous to have the valve close by de-energization of the solenoid whenever the apparatus is to be temporarily stopped by the manual operation above described. The water valve solenoid control switch would then be operated by a cam such as 36.

As an alternative construction, a pair of thin plate cams may be mounted in suitable closely spaced relation as shown in Fig. 5. For example, on shaft 24 there may be a plate cam 38.1 and a second plate cam 40.1, separated by spacer 35.1. Cam 38.1 is of uniform large radius and cam 40.1, for the most part of small radius, has one or more portions 41.1 of radius equal to cam 38.1 to operate the switch contacts to open circuit position. The toe of follower 20.1 has a ramp portion 42.1 and it will be apparent that when the shaft 24 is moved axially to the right of Fig. 5, cam 38.1 will engage ramp 42.1 and lift the follower until it rides on the rim of the cam; the associated switch will then be open. To reclose the circuit the shaft is moved to the left as before, and the follower will move back on to the small radius portion of cam 40.1. To avoid jamming and excess wear on ramp 42.1, it is preferred to round the edge of cam 38.1, as shown.

While there has been described what is at present considered to be the preferred embodiments of the invention, it will be understood that various modifications may be made therein, and it is intended to cover in the appended claims all such modifications as fall within the true spirit and scope of the invention.

I claim:

1. A program selector switch including a plurality of plate cams fixed in spaced relationship on a common cam shaft, timer motor means for rotating said shaft at a controlled rate, cam follower means for each cam mounted for displacement relative to said cam shaft, said follower means being in engagement with the edges of said cams and movable thereby between predetermined limits according to the contour of the associated cams, switch means associated with each said follower means and movable thereby between open and closed circuit positions, and means for manually rotating said cam shaft or moving it axially with respect to said cam follower means; at least one of said follower means being common to two adjacent cams and operating the associated switch between its said operating positions upon engagement of one or the other of the adjacent cams with said follower means during such axial shaft movement.

2. A program selector switch according to claim 1, in which ramp means is provided to facilitate the traversal of said follower from one to the other of said adjacent cams upon axial displacement of said cam shaft.

3. A program selector switch including a plurality of cams mounted on a common cam shaft, timer motor means for rotating said shaft at a controlled rate, cam follower means mounted for displacement relative to said cam shaft and being in engagement with said cams for movement thereby between predetermined limits according to the contour of the associated cams, switch means associated with each said follower means and movable thereby between open and closed circuit positions, and means for manually rotating said cam shaft or moving it axially with respect to said cam follower means; at least one of said follower means being common to two adjacent cams and operating the associated switch between its said operating positions upon engagement of one or the other of the adjacent cams with said follower means during such axial shaft movement, and detent means for establishing the limits for cam shaft of said cam shaft axial movement while permitting substantially unrestrained rotation of said cam shaft.

4. A program selector switch including a plurality of plate cams fixed in spaced relationship on a common cam shaft, means for rotating said shaft at a controlled rate, cam follower means for each cam mounted for displacement relative to the cam shaft, said follower means being in engagement with the edges of said cams and movable thereby between predetermined limits according to the contour of said cams, switch means associated with each said follower means and movable thereby between open and closed circuit positions, and means for manually rotating said cam shaft or moving it axially with respect to said cam follower means; at least two of said cams being sufficiently closely spaced on said cam shaft for one or the other to engage the same cam follower as the shaft is moved axially with respect thereto, one said cam having a continuous peripheral contour effective to move the cam follower to switch-opening position upon engagement with said follower, and the second cam having an interrupted peripheral contour effective to move the cam follower between switch opening and closing positions at predetermined intervals.

5. A program selector switch according to claim 4, in which the said closely spaced cams are parts of an integral structure.

6. A program selector switch according to claim 4, in which the said closely spaced cams are parts of an integral structure, there being a sloping ramp portion between the first of said cams and certain portions of the other of said cams.

7. A program selector switch including a plurality of plate cams fixed in spaced relationship on a common cam shaft, means for rotating said shaft at a controlled rate, cam follower means for each cam mounted for displacement relative to the cam shaft, said follower means being in engagement with the edges of said cams and movable thereby between predetermined limits according to the contour of said cams, switch means associated with each said follower means and movable thereby between open and closed circuit positions, and means for manually rotating said cam shaft or moving it axially with respect to said cam follower means; at least two of said cams being sufficiently closely spaced on said cam shaft for one or the other to engage the same cam follower as the shaft is moved axially with respect thereto, one said cam having a continuous peripheral contour effective to move the cam follower to switch-opening position upon engagement with said follower, and detent means for establishing the limits of axial displacement of said cam shaft to effect transition of said cam follower from one to the other of said closely spaced cams.

DOUGLAS F. ILLIAN.

REFERENCES CITED

The following references are of record in the file of this patent:

UNITED STATES PATENTS

| Number | Name | Date |
| --- | --- | --- |
| 2,527,249 | Gallagher | Oct. 24, 1950 |